United States Patent
Koch

(10) Patent No.: US 7,473,348 B2
(45) Date of Patent: Jan. 6, 2009

(54) DIESEL OIL FROM RESIDUES BY CATALYTIC DEPOLYMERIZATION WITH ENERGY INPUT FROM A PUMP-AGITATOR SYSTEM

(75) Inventor: Christian Koch, Buttenheim (DE)

(73) Assignee: Alphakat GmbH, Buttenheim (DE)

( * ) Notice: Subject to any disclaimer, the term of this patent is extended or adjusted under 35 U.S.C. 154(b) by 401 days.

(21) Appl. No.: 10/891,971

(22) Filed: Jul. 15, 2004

(65) Prior Publication Data
US 2005/0115871 A1   Jun. 2, 2005

(30) Foreign Application Priority Data
Dec. 2, 2003  (DE) .............................. 103 56 245

(51) Int. Cl.
C10G 11/00 (2006.01)
C10G 11/05 (2006.01)

(52) U.S. Cl. ............. 208/113; 208/120.15; 208/120.25; 126/247; 366/22; 366/23; 366/24; 366/144; 585/240; 585/242

(58) Field of Classification Search ............... 208/113, 208/120.15, 120.25; 585/240, 242; 126/247; 366/22, 23, 24, 144
See application file for complete search history.

(56) References Cited

U.S. PATENT DOCUMENTS

| 1,754,136 | A | * | 4/1930 | Woidich | 208/61 |
| 1,904,586 | A | * | 4/1933 | Winkler et al. | 208/428 |
| 4,300,009 | A | * | 11/1981 | Haag et al. | 585/408 |
| 4,663,025 | A | * | 5/1987 | Fu | 208/120.15 |
| 5,073,251 | A | * | 12/1991 | Daniels | 208/407 |
| 5,244,565 | A | * | 9/1993 | Lankton et al. | 208/92 |

FOREIGN PATENT DOCUMENTS

DE   100 49 377 A1   4/2002

* cited by examiner

Primary Examiner—Glenn Caldarola
Assistant Examiner—Prem C. Singh
(74) Attorney, Agent, or Firm—Cohen, Pontani, Lieberman & Pavane LLP

(57) ABSTRACT

Production of diesel oil from hydrocarbon-containing residues in an oil circuit with solids separation and product distillation for the diesel product with energy input by means of pumps and counterrotating agitators and by the use of fully crystallized catalysts of potassium, sodium, calcium, and magnesium-aluminum silicates, where all surfaces are cleaned continuously by the agitator mechanisms.

11 Claims, 1 Drawing Sheet

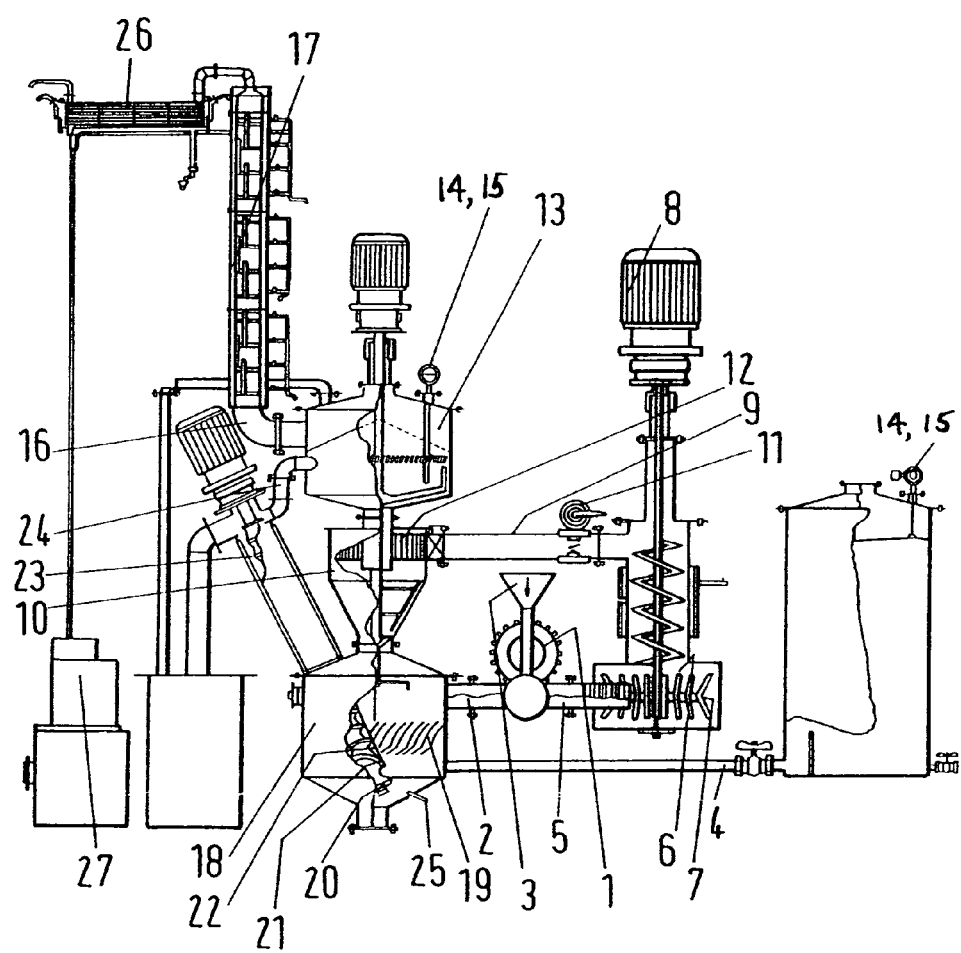

DIESEL OIL FROM RESIDUES BY CATALYTIC DEPOLYMERIZATION WITH ENERGY INPUT FROM A PUMP-AGITATOR SYSTEM

BACKGROUND OF THE INVENTION

1. Field of the Invention

The invention comprises a process and a device for the catalytic cracking of hydrocarbon molecules at temperatures of 300-400° C. using alkali-doped aluminum silicates as catalyst, where the energy input is provided primarily by a combination of pumps and agitators, which are connected to a separation tank for the separation of mineral contaminants.

2. Description of the Related Art

Catalytic depolymerization using a special catalyst consisting of sodium-doped aluminum silicate is known from DE 100 49 377. With the use of this catalyst, the hydrocarbon-containing residue is cracked into diesel oil and gasoline. The heat required to produce the energy for cracking, the energy required to evaporate the cracked hydrocarbons in the form of diesel oil and gasoline, and the energy for the initial heating phase and also the heat required to make up for losses are supplied in this case by heating through the wall.

The disadvantage of this process is that, because of the wall, the heating temperature must be higher than the reaction temperature. As a result, a certain amount of reaction coke is always formed. When the temperature of the wall increases relative to the temperature of the reaction mixture, that is, when a certain production output is to be obtained, the amount of coke will also increase.

This reaction coke now reacts with the sodium-doped aluminum silicate to form a nonreactive residue, which contaminates the system and brings the reaction to a standstill. This reaction mixture of catalyst and reaction coke interacts with the wall of the device, forming a hard residue, and a great deal of effort is required to clean it off during the scheduled maintenance intervals.

An economical process is therefore impossible to obtain by heating the wall intensively, that is, by attempting to supply heat actively by conducting it through the wall. The lower thermal conductivity of the reaction oil in the circuit results in a greater temperature difference between the heating located externally on the wall and the reaction in the oil, which the cracking energy (depolymerization), the evaporation energy, and the heating energy require.

If there is only waste oil and tars in the oil circuit, approximately 0.4 kWh of energy is required per kg of evaporated diesel for cracking, for evaporation, and for raising the temperature from the inlet temperature of 250° C. to the reaction temperature of 390° C. When plastics are added to the feedstock, the energy requirement is almost twice as high, because these materials are loaded cold and extra energy is required to melt them.

SUMMARY OF THE INVENTION

A surprising heat input process and a suitable catalyst have now been discovered, which completely avoid these disadvantages. The system does not transport heat through the wall but rather releases the heat directly in the reaction system.

The energy is supplied by a system consisting of a pump and a counterrotating agitator or mechanical stirrer system, followed by separation of the diesel oil vapor in a high-speed hydrocyclone. The agitator systems also serve to clean all of the surfaces in the circuit.

The catalyst is also a new development. The doping of a fully crystallized Y molecule with sodium was found to be optimal only for plastics, bitumen, and waste oils. For biological feedstock such as grease and biological oils, doping with calcium was found to be optimal. For the reaction with wood, doping with magnesium is necessary to produce high-quality diesel oil. For the highly halogenated compounds such as transformer oil and PVC, it is necessary to dope with potassium.

The product of the system is diesel oil, because the product discharge from the circuit at 300-400° C. leaves no other lighter products behind in the system. 10% of this product is used to generate the process energies in the form of electric current in a power-generating unit. The advantage of this energy conversion is the simultaneous solution of the problem of what to do with the small amounts of gas which form in the system: this gas is added to the feed air, and the thermal energy of the exhaust gases of the power generator is used to predry and to preheat the feedstock.

BRIEF DESCRIPTION OF THE DRAWING

The sole FIGURE is a diagram of the process according to the invention.

DETAILED DESCRIPTION OF THE PREFERRED EMBODIMENT

Referring to the FIGURE, the pump 1 has a suction side 2 provided with a feed hopper 3 and a connection to the circulating oil line 4. A pressure line 5 on the output side of the pump leads tangentially into the agitation tank 6. An agitator 7, driven by the electric motor 8 and rotating in the direction opposite the tangential arrival of the feedstock, is provided in the tank 6. The agitator 7 is also provided with upward-pointing cleaning arms, which pass over the entire surface of the agitation tank.

The agitation tank 6 is connected by a connecting pipeline 9 to a hydrocyclone 10. An automatic control valve 11, which regulates the pressure in the downstream apparatus, is installed in this connecting pipeline. In a special embodiment, an additional pump is provided in this line; this pump is controlled as a function of pressure by way of a frequency converter along with the pump 1. The hydrocyclone 10 has in its interior a venturi nozzle 12 resting against the inside wall, which also lowers the remaining excess pressure and amplifies the separation effect.

Above the hydrocyclone 10 there is a safety tank 13, which has an automatic level control device 14 with an oil level meter 15. An agitator mechanism 30 is mounted on the safety tank 13; this agitator is driven by an electric motor 31 and has cleaning arms in the lower part of the safety tank 13, for the cyclone, and in the tank underneath the cyclone.

From one side of the safety tank 13, the product vapor line 16, which carries the diesel vapor produced, leads to the distillation unit 17 with the condenser 26. The condenser 26 is a water-cooled condenser of the bundled-tube type, the water being recycled through the coolant circuit.

Any water which may have formed is separated in the forward part of the condenser 26. This is discharged separately with the help of a conductivity sensor and an automatically controlled drain valve, with the result that no water is present in the product. The diesel product is conducted away at the top of the column through the upper discharge port. The quality of the diesel oil is automatically controlled via the reflux line by appropriate adjustment of the reflux rate.

The reflux line has a connection to the diesel supply tank of the power generator 27, which supplies the system with current. This generator consumes approximately 10% of the produced diesel oil to generate the power required by the plant itself, and the exhaust gas of the generator also provides the heat used to predry and to preheat the oils.

All the tanks are equipped with external electrical heating units to facilitate the heat-up phase. Underneath the hydrocyclone 10 there is the separation tank 18 with its slanted plates 19, which ensure the separation of the constituents of the feedstock which cannot be converted to diesel oil.

This separation tank 18 is connected to the suction pipe 2. At the bottom of the separation tank 18 there is a temperature sensor 25, which puts the discharge screw 20 into operation when the temperature at the temperature sensor 25 falls below a certain limit value as a result of the insulating effect of the residues.

The discharge screw 20 has a filter section 21 within the tank 18, which allows the liquid components to flow back through the filter screen 22 into the separation tank 18, and an electrically heated low-temperature carbonization section 23 outside the separation tank 18, which allows the remaining oil fractions to evaporate from the press cake. For this purpose, provisions are made to increase the temperature to as high as 600° C. The oil vapors escaping from the low-temperature carbonization conveyor section 23 pass through the vapor line 24 and thus arrive in the safety tank 13.

The invention is explained in greater detail below on the basis of an exemplary embodiment. A rotary pump 1 with a drive power of 200 kW conveys feed oil at a rate of 5,000 L/h from a suction line 2 and 600 kg of residues in the form of waste oil and bitumen at a total rate of 5,600 L/h from the material feeder 3 into the pressure line 5, which leads tangentially into the agitation tank 6 with a diameter of 1,400 mm. An agitator 7, which rotates in the opposite direction, is installed in the tank and is driven by the 40 kW electric motor 8. The agitator 7 also has upward-extending cleaning arms, which pass over the entire surface of the agitation tank, that is, both the lower part of the agitation tank with a diameter of 1,400 mm and also the upper part with a diameter of 500 mm.

The agitation tank 6 is connected by a connecting pipeline 9 with a diameter of 200 mm to a hydrocyclone 10. An automatic control valve 11 is installed in the connecting line to regulate the pressure in the downline apparatus. The hydrocyclone 10 has a diameter of 1,000 mm, and in its interior it has a venturi nozzle 12 positioned on the inside wall with a narrowest cross section of 100×200 mm, which also lowers the remaining excess pressure and increases the separation effect.

A safety tank 13 with a diameter of 2,000 mm and an automatic level control device 14 connected to an oil level meter 15 are installed above the hydrocyclone. An agitator is mounted to the safety tank 13; this agitator is driven by a 10 kW electric motor and has cleaning arms for the lower part of the safety tank 13, the cyclone 10, and the separation tank 18 situated underneath the cyclone.

To the side of the safety tank 13, the product vapor line 16 for the diesel vapor produced leads to the distillation unit 17 with a column diameter of 500 mm. All tanks are equipped with external electric heating with a total output of 50 kW to facilitate the heat-up phase.

Underneath the hydrocyclone 10 is the separation tank 18 with a diameter of 2,000 mm. This tank has slanted disks 19, which ensure the separation of the constituents of the feedstock which cannot be converted to diesel oil. This separation tank 18 is connected to the suction pipe 2, which has a diameter of 200 mm. A temperature sensor 25, which puts the discharge screw 20 into operation when the temperature has fallen below a certain limit value as a result of the insulating effect of the residues, is installed at the bottom of the separation tank 18.

The discharge screw 20, which has a diameter of 80 mm and a delivery rate of 10-20 kg/h, has a filter section 21 within the tank, which allows the liquid components to flow back through the filter screen 22 into the separation tank 18, and an electrically heated low-temperature carbonization section 23 outside the separation tank 18 with a heating power of 45 kW, which allows the remaining oil fractions to evaporate from the press cake. For this purpose, provisions are made to increase the temperature to 600° C. The oil vapors escaping from the low-temperature carbonization screw 23 pass through the vapor line 24 and arrive in the safety tank 13.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. A method of producing diesel oil from a feed oil containing hydrocarbon-containing residues, the method comprising the following sequential steps:
    producing a flow of feed oil, the flow having a flow energy;
    inputting hydrocarbon-containing residues into the feed oil;
    heating the residue-containing feed oil;
    separating solids from the residue-containing feed oil;
    distilling the residue-containing feed oil to produce a distillate; and
    producing diesel oil from the distillate,
    wherein all of the heating required by said step of heating is accomplished by converting at least some of the flow energy into heat.

2. The method of claim 1, wherein the flow energy is converted to heat by an agitator moving oppositely to the flow of residue-containing feed oil.

3. The method of claim 1, wherein said heating further comprises generating an energy entry into said flow by means of an agitator moving oppositely to the flow of residue-containing feed oil, thereby producing heat in the residue-containing feed oil.

4. The method of claim 1, further comprising adding at least one catalyst to said residue-containing feed oil in order to catalyze breakdown of said residues, said catalyst comprising fully crystallized Y-molecules doped with sodium for breaking down residues containing mineral hydrocarbons.

5. The method of claim 1, further comprising adding at least one catalyst to said residue-containing feed oil in order to catalyze breakdown of said residues, said catalyst comprising fully crystallized Y-molecules doped with calcium for breaking down residues containing biological feedstock.

6. The method of claim 1, further comprising adding at least one catalyst to said residue-containing feed oil in order to catalyze breakdown of said residues, said catalyst comprising fully crystallized Y-molecules doped with magnesium for breaking down residues containing wood.

7. The method of claim 1, further comprising adding at least one catalyst to said residue-containing feed oil in order to catalyze breakdown of said residues, wherein said at least one catalyst comprises fully crystallized Y-molecules doped with potassium for breaking down residues containing highly halogenated compounds.

8. The method of claim 1, further comprising regulating the flow of residue-containing feed oil by means of a throttle valve in a connecting line and a venturi nozzle where the connecting line enters a hydrocyclone.

9. The method of claim 1, further comprising measuring a filling level of residue-containing feed oil and controlling the input of residues and converting the flow energy into heat in the residue-containing feed oil depending on the measured filling level.

10. The method of claim 1, wherein the input of residues and the generation of energy in the residue-containing feed oil are controlled in order to maintain a desired filling level of residue-containing feed oil.

11. The method of claim 1, wherein the flow of feed oil is produced by means of at least one pump.

* * * * *